Patented May 2, 1939

2,156,346

UNITED STATES PATENT OFFICE 2,156,346

CONCENTRATION OF ALIPHATIC ACIDS

Herbert E. Martin, Cumberland, Md., assignor to Celanese Corporation of America, a corporation of Delaware No Drawing. Application July 13, 1937, Serial No. 153,359

10 Claims. (Cl. 260—541)

This invention relates to improvements in the manufacture of concentrated lower aliphatic acids from their solutions, and particularly their dilute solutions of whatever origin, and particularly to the manufacture of concentrated acetic acid from crude pyroligneous acid, from dilute acetic acid obtained as a by-product in the acetylation of cellulose, and from fermentation of acid, etc.

This application is a continuation-in-part of my application Serial No. 117,151, filed December 22, 1936.

An object of the invention is to provide an economical process for extracting the lower aliphatic acids from relatively dilute solutions containing the same by means of an extracting medium. A further object of the invention is to provide a process for extracting the lower aliphatic acids from relatively dilute solutions containing the same by means of an extracting medium. A further object of the invention is to provide a process for extracting the lower aliphatic acids from relatively dilute solutions of the same wherein the mixture of extractant and acid does not dissolve an excessive amount of water and wherein the amount of acid left in the extracted mother liquor is negligible. Other objects of the invention will appear from the following detailed description.

It is known that acetic acid may be extracted from dilute aqueous solutions of the same with the aid of liquids which are insoluble or relatively insoluble in water. In extracting the acid, the extractant and dilute acid solution may be mixed together in any of a number of ways, the mixture of extractant and acid are then separated from the aqueous solvent and then the acid and extractant are separated by distillation in a still equipped with a reflux column. When employing extractants commonly used prior to this invention, it was necessary to operate the process in such a manner that the mixture of extractant and acid going to the still should contain less acid than the extractant is capable of carrying. If the acid concentration of the acid extractant mixture exceeds a given amount, the percentage of water dissolved in the mixture is increased beyond that point where the water of extractant can be azeotropically separated from the acid.

If the acidity of the extractant is increased above a given point, more water dissolves in the mixture of acid and extractant. There is then not sufficient extractant to remove this additional water by azeotropic distillation. This distillation process is unbalanced by this condition and operation is unsatisfactory, as the excess water carries acetic acid with it if removed by distillation. If the water is not removed anhydrous acid is not recovered. It is then necessary to introduce additional acid free extractant to the still to effect an azeotropic separation of the excess water. Adding this extractant means reducing the ratio of acid extracted to extractant employed. Thus, in processes employed prior to this invention, this balance of extractant, acid and water had to be carefully maintained for efficient operation. This balance naturally varies with the extractant employed and, in many cases, the critical range of the balance is very limited.

As stated in the parent application, I have found that iso-propyl acetate when employed as the extractant permits of an acid concentration in the acid extractant mixture of from 1% to about 21%. However, it is found that as the concentration of the acid increases there is a tendency for the extractant to pick up more water than will azeotropically distil from the acid in the separation of the acid from the extractant. I have now found that if from 10 to 30 parts of n-propyl ether is added to 90 to 70 parts of the iso-propyl acetate, the extractant thus formed is sufficiently water-repellant that it will not pick up an excess of water when the acid concentration is relatively high.

In accordance with my invention, I extract aliphatic acids from aqueous solutions containing the same by means of an extractant comprising 90 to 70 parts of iso-propyl acetate and 10 to 30 parts of normal propyl ether, preferably an extractant containing 80 parts iso-propyl acetate and 20 parts normal propyl ether. The extractant also preferably contains a small percentage of a compound which inhibits the hydrolysis of the ester and another compound which inhibits the formation of peroxides from the ether under the conditions obtaining in the extracting process. If desired, a single substance may be used for both purposes.

Any suitable inhibitor against the hydrolysis of the ester may be used. I have found very effective inhibitors to be sodium acetate, potassium acetate, sodium sulphate, potassium sulphate and like compounds. These inhibitors may be dissolved in water and added to the dilute aqueous solution of aliphatic acid entering the system or the inhibitors may be added to the extracting medium entering the system. It is obvious that if alkali carbonates and/or bicarbonates are added they will be changed to the acetate or the sulphate which, as stated above, are the desired inhibitors. The amount of alkali salt employed as the inhibitors may vary from 0.05 to 2% of a concentrated aqueous solution of the same, the quantity being based on the amount of ester in the extractant entering the system.

A trace or more of sulphuric acid in the dilute solution from which acid is to be extracted increases the hydrolysis of the ester employed as one constituent of the extractant. Therefore, if the dilute acetic acid contains any sulphuric acid, which is often the case when the dilute acid is obtained from processes involving the acetylation of cellulose, the sulphuric acid may be neutralized with sodium bicarbonate, sodium acetate or their equivalents prior to its entrance into the extracting system. As stated above, sodium sulphate is an excellent inhibitor against hydrolysis of the ester. Therefore, if a trace of sulphuric acid is present the same may be neutralized by sodium carbonate or sodium acetate forming sodium sulphate in situ due to the reaction of the same with the sulphuric acid.

Under the conditions of extraction there is a tendency for normal propyl ether to form into peroxides. Therefore, I prefer to employ in the extractant from 0.05 to 2% of an inhibitor which tends to prevent the normal propyl ether from forming peroxides. Suitable inhibitors are powdered copper and the various copper salts such as copper sulphate, copper acetate and the like. The inhibitor for the ether may be added to the system in the same manner as stated above with reference to the inhibitors for the ester.

After extraction of the acid, from the aqueous solution containing the same, with the extractant, the acid may be removed from the extractant by fractional distillation or in any other suitable manner. The inhibitors for the most art will pass out of the system with the effluent water.

This invention is applicable to the separation of aliphatic acid from any aqueous solution of the same. By aliphatic acid is meant acetic, butyric, propionic and other members of the series.

This invention has been described with particular reference to the recovery of concentrated acetic acid from aqueous solutions of said acid derived from the pretreatment of cellulose and the acetylation of cellulose in the manufacture of cellulose acetate and products containing the same. It is understood, however, that the invention is not limited to dilute acid received from such a source. Other sources of the dilute acid may be aqueous aliphatic acid solutions such as crude pyroligneous acid obtained by the destructive distillation of wood or other vegetable matter, liquors obtained from the fermentation of apples, grapes or other vegetable matter, the destructive distillation of aliphatic acid salts, etc.

The extraction may be carried out in any known manner. It is preferably carried out, however, in a plant or device fully described in my application Serial No. 747,083, filed October 5, 1934. In this device the extractant and the dilute aqueous acid enter at opposite ends of a column or series of columns and flow counter-current to each other. The columns, insofar as this invention is concerned, may be empty and a turbulent flow created therein, or they may be partially or wholly filled with surface forming materials such as Raschig rings, broken stone or earthenware, beads or balls, deflector plates, etc. The stripped water is withdrawn from the system while the extractant containing the extracted acid is withdrawn from the system to a still or other separating system.

Other methods of carrying out the extraction may be employed. For instance, it may be carried out as a batch process wherein a dilute acid with the inhibitor and the extracting medium are introduced into a tank, thoroughly mixed and then permitted to separate into layers which are separately drawn off. For further efficiency, it is better to carry out the batch extraction in a series of tanks in a methodical manner, i. e. the first tank is fed with fresh extraction medium and dilute acid containing the inhibitor that has been subjected to a previous extraction treatment, while the last tank is fed with fresh dilute acid, the inhibitor and the extracting medium that has been used for former extractions and is therefore charged with acid.

Although this invention has been described particularly with reference to concentration of acetic acid, it is to be understood that it is not so limited and that it is applicable to the separation of any of the acids named above.

In order to further illustrate this invention without being limited thereby, the following example is given:

*Example*

To 100 parts by volume of aqueous acetic acid of 31% strength is mixed about 1 part by volume of a concentrated aqueous solution of sodium sulphate and about 1 part by volume of a concentrated solution of copper sulphate. This mixture is run counter-current through a series of columns, partially filled with Raschig rings, to a stream of extractant containing 80 parts by weight of iso-propyl acetate and 20 parts by weight of normal propyl ether. To every 100 parts of dilute acid there is employed about 147 parts of extractant. The temperature in the extracting column is maintained at about 25° C. The extracting medium with its extracted acid is passed to a still where the extracting medium with any dissolved water as an azeotropic mixture is separated from the acid leaving an anhydrous acid of above 99% purity.

It is to be understood that the foregoing detailed description is merely given by way of illustration and that many variations may be made without departing from the spirit of my invention.

Having described my invention, what I desire to secure by Letters Patent is:

1. Process for the concentration of an aqueous solution of a lower aliphatic acid, which comprises extracting the acid from the aqueous solution with an extracting medium containing a mixture of isopropyl acetate, normal propyl ether and a small proportion of a salt of an alkali metal.

2. Process for the concentration of an aqueous solution of acetic acid, which comprises extracting the acid from the aqueous solution with an extracting medium containing a mixture of isopropyl acetate, normal propyl ether and a small proportion of a salt of an alkali metal.

3. Process for the concentration of an aqueous solution of a lower aliphatic acid, which comprises extracting the acid from the aqueous solution with an extracting medium containing 70 to 90 parts by weight of isopropyl acetate and 30 to 10 parts by weight of normal propyl ether in the presence of a small proportion of a salt of an alkali metal.

4. Process for the concentration of an aqueous solution of acetic acid, which comprises extracting the acid from the aqueous solution with an extracting medium containing 70 to 90 parts by weight of isopropyl acetate and 30 to 10 parts by weight of normal propyl ether in the presence of a small proportion of a salt of an alkali metal.

5. Process for the concentration of an aqueous solution of a lower aliphatic acid, which comprises extracting the acid from the aqueous solution with an extracting medium containing a mixture of isopropyl acetate, normal propyl ether and a small proportion of a salt of an alkali metal in the presence of a substance selected from the group consisting of powdered copper and copper salts.

6. Process for the concentration of an aqueous solution of acetic acid, which comprises extracting the acid from the aqueous solution with an extracting medium containing a mixture of isopropyl acetate, normal propyl ether and a small proportion of a salt of an alkali metal in the presence of a substance selected from the group consisting of powdered copper and copper salts.

7. Process for the concentration of an aqueous solution of a lower aliphatic acid, which comprises extracting the acid from the aqueous solution with an extracting medium containing 80 parts by weight of isopropyl acetate, 20 parts by weight of normal propyl ether and a small proportion of sodium sulphate and powdered copper.

8. Process for the concentration of an aqueous solution of acetic acid, which comprises extracting the acid from the aqueous solution with an extracting medium containing 80 parts by weight of isopropyl acetate, 20 parts by weight of normal propyl ether and a small proportion of sodium sulphate and powdered copper.

9. Process for the concentration of an aqueous solution of a lower aliphatic acid, which comprises extracting the acid from the aqueous solution with an extracting medium containing 80 parts by weight of isopropyl acetate, 20 parts by weight of normal propyl ether, from 0.05 to 2% of a concentrated aqueous solution of sodium sulphate and from 0.05 to 2% of powdered copper.

10. Process for the concentration of an aqueous solution of acetic acid, which comprises extracting the acid from the aqueous solution with an extracting medium containing 80 parts by weight of isopropyl acetate, 20 parts by weight of normal propyl ether, from 0.05 to 2% of a concentrated aqueous solution of sodium sulphate and from 0.05 to 2% of powdered copper.

HERBERT E. MARTIN.